J. L. HILLER.
CENTRIFUGAL APPARATUS.
APPLICATION FILED SEPT. 19, 1913.

1,280,469.

Patented Oct. 1, 1918.
2 SHEETS—SHEET 1.

WITNESSES:
Robt R Ketchel
Frank E French

INVENTOR
Joseph L. Hiller.
BY Augustus B Stoughton
ATTORNEY.

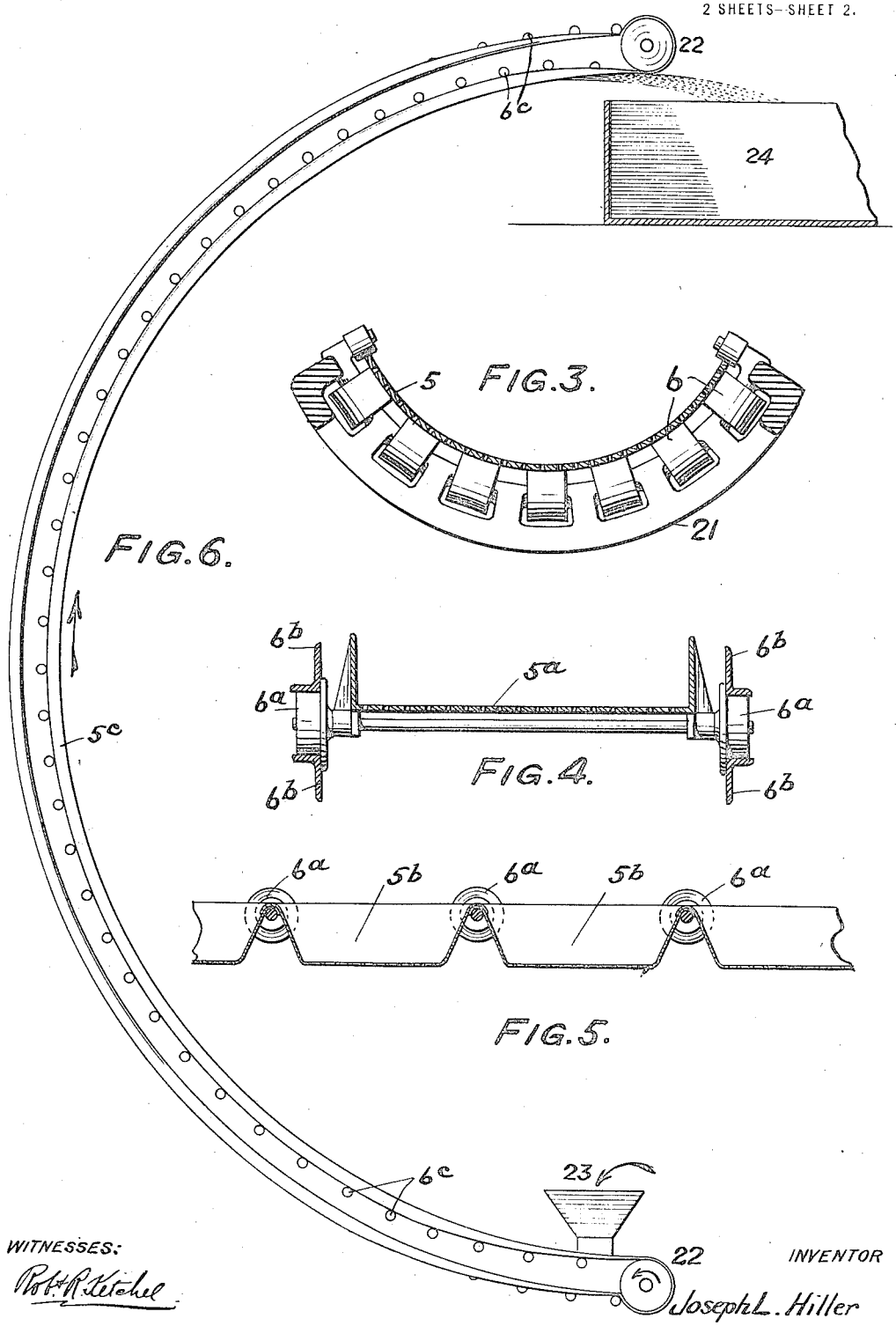

UNITED STATES PATENT OFFICE.

JOSEPH L. HILLER, OF MATTAPOISETT, MASSACHUSETTS.

CENTRIFUGAL APPARATUS.

1,280,469. Specification of Letters Patent. Patented Oct. 1, 1918.

Application filed September 19, 1913. Serial No. 790,603.

*To all whom it may concern:*

Be it known that I, JOSEPH L. HILLER, a citizen of the United States, residing at Mattapoisett, in the county of Plymouth and State of Massachusetts, have invented certain new and useful Improvements in Centrifugal Apparatus, of which the following is a specification.

The principal objects of the present invention are to make the process continuous; to permit the solid material to remain on the filtering or permeable member in a practically quiescent state during its treatment; to control the rate of feed and discharge of the material treated; to control the pressure on the material being treated; to make the process continuous while at the same time subjecting the material to treatment with its solids in a state of quiescence whereby fine solids are not expelled in admixture with fluids; and to provide for changing or adjusting the pressure to which the material is subjected and also the duration of the treatment of the material.

The invention will be claimed at the end hereof but will be first described in connection with apparatus chosen from other embodiments of the invention and illustrated in the accompanying drawings, in which—

Fig. 3, is a view drawn to an enlarged scale and it is a cross-section of the belt or conveyer.

Fig. 4, is a similar view showing a modification of the conveyer or belt.

Fig. 5, is a side view showing another modification of belt or conveyer, and

Fig. 6, is a diagrammatic view illustrating the use of certain features of the invention apart from certain other features.

Figure 1:
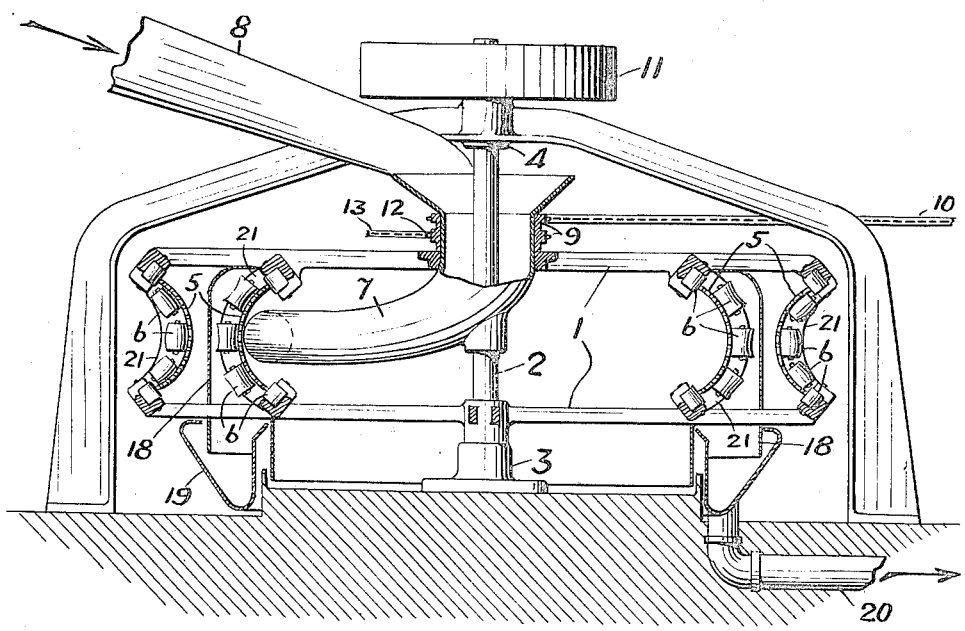
Figure 1, is a view, principally in central section, of apparatus embodying features of the invention.

In the drawings 1, is a rotating member or frame. As shown it is fast upon a spindle 2, rotatably mounted in bearings 3 and 4, and the frame itself is illustrated as consisting of top and bottom spiders. These matters relate to construction and are details not of the essence of the invention. The point is that there shall be a rotating frame and it is not material whether the axis of rotation is vertical, horizontal or free to change its position. 5, is a filtering medium or material permeable by the fluids but substantially not permeable by the solids, under centrifugal treatment. It is shown to comprise an endless belt or conveyer permeable by the fluids only, or it may be made up of a perforated back and a porous face or otherwise constructed in an appropriate manner. There are guide rollers or guides 6, carried by the frame 1, and disposed in the arc of a circle and around these the filtering medium 5, in the form of an endless belt or conveyer is arranged. The filtering medium, belt or conveyer 5, as a whole travels with the frame 1 and it may be caused to additionally travel by imparting lineal motion to it, either faster or slower than the frame, or at the same rate of speed, if desired. 7, is a feeder carried by or rotatable with the frame and adapted to discharge on the operative face of the belt 5. One feeder is shown but a plurality of feeders discharging the same or different substances may be employed. 8, is a chute that may be provided for introducing material to the feeder. 9, is a sprocket wheel which may be rotated independently of the feeder or permitted to stand at rest by means of the sprocket chain 10, the motion and speed of which can be controlled. The motion and speed of the frame 1, can also be controlled since it is independently driven as by the pulley 11, to which different speeds can be applied. There is a sprocket wheel 12, connected with the sprocket wheel 9, and geared by the sprocket chain 13, with one of the wheels 14, around which the belt 5, passes and by which it is driven. 15, is a pulley or wheel around which the belt also passes, and the parts 14 and 15, move with the frame 1. The broken circle constituting the path of the belt may be fairly complete leaving only sufficient space as at 16, for the discharge of the solids as at 17. 18, is an annular guard encircling the operative or inner face of the belt, conveyer or filter 5, and its purpose is to catch fluids and deflect them into the trough 19, having an outlet 20. As shown in Figs. 1 and 3, the guide rolls or guides 6, are pivoted in curved bars 21, arranged between the top and bottom spiders of the frame. In this case the belt or conveyer is convex away from the center of rotation at the smaller circle or arc, and toward the center of rotation at the larger circle or arc. The concavity of the part 5, on the inner circle or arc gives it, as it were, a channeled section and better adapts it to withstand the action of centrifugal force, without deformation between the rows of guides 6. On the outer circle the concavity performs the same function, and the object of reversing the direction on the concavities is to prevent unnecessarily bending the belt or conveyer. In Figs. 4 and 5, the conveyer or belt is not convex and the guide rollers 6ª, run in appropriate ways or channels 6ᵇ, arranged in appropriate arcs. In Fig. 4, the belt, conveyer or filtering medium 5ª, is flat whereas in Fig. 5, it is pocketed as at 5ᵇ. Since both edges of the filtering material, belt or conveyer lie in a plane parallel with the axis of revolution, it follows that the solids remain quiescent and do not escape or try to escape over the edge of the filtering medium, belt or conveyer during centrifugal treatment.

Figure 2:
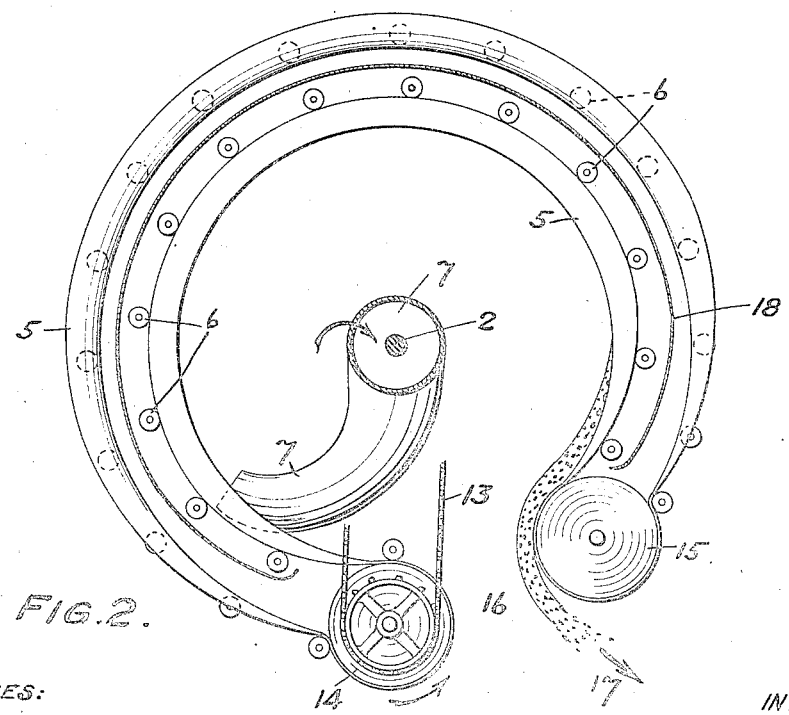
Fig. 2, is a top or plan view diagrammatic in character of parts of the apparatus shown in Fig. 1.

It is evident that the inner face of the belt or conveyer travels in the arc of a circle being to that end properly guided, as by guides 6. If sufficient lineal speed be imparted to the belt or conveyer, whether the same is permeable or not, it is evident that solid material in a quiescent state by the action of centrifugal force can be held to and made to travel with the belt or conveyer, and this is true whether the belt or conveyer be carried by a rotating frame and driven in the same direction of rotation as or faster than the frame, or whether the belt or conveyer arranged as described, be carried by some fixed frame or support. Moreover, it makes no difference whether the axis around which the belt or conveyer is traveling in an arc-like path is horizontal, vertical or inclined, so that referring to Fig. 6, the belt or conveyer 5ᶜ, guided in the arc of a circle by guides 6ᶜ, and having sufficient lineal velocity imparted to it as by either or both of the pulleys 22, can be used for lifting material from the inlet 23, to a point as 24, overhead. It may be remarked that the construction last described can be utilized in a comparatively small space for obtaining a relatively high lift. Turning now to the structure shown in Figs. 1 and 2, the material to be subjected to centrifugal separation or action is fed by the feeder 7, to the inner or operative face of the belt or conveyer 5, which is a filtering or like medium. The rotation of the frame subjects the material to centrifugal force or action under pressure that may be varied by changing the speed of rotation of the frame or the lineal speed or direction of motion of the belt or conveyer. In consequence fluid passes through the medium 5, is caught by the guard 18, and may be led away at 20. The separating or filtering medium is moved relatively with respect to the frame with the solids quiescent thereon so that the latter are withdrawn continuously as at 17, and at any required or appropriate rate. The fact that the solids are quiescent is very important for if they should be disturbed their finer particles or parts escape with the fluid through the filtering medium. The avoidance of such an escape of solids with the fluids combined with the attainment of a continuous feed is a matter of utmost importance, novelty and utility as will be understood by those skilled in the art. As shown the solids are thrown from the machine and may be collected in any appropriate or desired manner.

It will be obvious to those skilled in the art that modifications may be made in details of construction and arrangement without departing from the spirit of the invention, for example, the direction of rotation of the frame 1, may be changed and the relative direction of rotation of the belt or conveyer 5, in respect to the direction of rotation of the frame 1, can be changed. Furthermore parts of the structure can be used without other parts, for example, the belt or conveyer, the means for guiding it in the arc of a circle, and the means for giving it sufficient lineal speed for carrying material through the operation of centrifugal force can be used without the rotating frame and as indicated in Fig. 6. Those seeking to avoid my patent may endeavor to do so by employing other forms instead of a circle, hence the terms arc or arc of a circle includes such forms, for example it includes spiral, helical, polygonal and analogous forms. Hence the invention is not limited as to those matters nor in any way further than the prior state of the art may require, but

What I claim is:

1. In a centrifugal separator the combination of a rotating frame, guides carried by the frame and arranged in the arcs of two broken circles, an endless permeable conveyer traveling inside the inner circle and outside of the outer circle and guided by said guides, means carried by the frame for driving the conveyer, a feeder traveling with the frame and feeding to the inner face of the conveyer, and a guard between the oppositely moving portions of the conveyer substantially as described.

2. In a centrifugal machine the combination of a conveyer, a rotary frame, means carried by the frame and constituting arcs of concentric circles for guiding oppositely moving portions of the conveyer in such arcs with its carrying face toward the common center of the arcs, other guiding devices independent of the first named guiding devices and arranged at the ends of said arcs and around which the conveyer passes, and means for driving the last named guiding devices, substantially as described.

3. In a centrifugal machine the combination of a transversely concave conveyer, a rotating frame, guiding means carried by the frame and constituting an arc of a circle for guiding the conveyer in such arc, other guiding devices independent of the first named guiding devices and arranged at the ends of said arc and around which the conveyer passes, means for driving the last named guiding devices to impart lineal velocity to the conveyer, and a feeding element arranged between the last named guiding devices.

4. In a centrifugal machine the combination of a rotating member, a medium permeable by some and impermeable by other substances carried by said member, devices for guiding said medium in the arc of a circle, and means for lineally moving said medium either in the same or in opposed direction in respect to said member, substantially as described.

5. In a centrifugal machine the combination of guides arranged in the arcs of circles, an endless transversely concave conveyer running around said guides, and means for moving the conveyer with a velocity sufficient to develop centrifugal force in excess of gravity.

In testimony whereof I have hereunto signed my name.

JOSEPH L. HILLER.

Witnesses:
    CLIFFORD K. CASSEL,
    FRANK E. FRENCH.